United States Patent [19]
Hughbanks et al.

[11] Patent Number: 5,491,605
[45] Date of Patent: Feb. 13, 1996

[54] SHORTED MAGNETORESISTIVE HEAD ELEMENTS FOR ELECTRICAL OVERSTRESS AND ELECTROSTATIC DISCHARGE PROTECTION

[75] Inventors: Timothy S. Hughbanks, Morgan Hill; Hin Pong E. Lee, San Jose; Peter B. P. Phipps, Saratoga; Neil L. Robertson, Campbell; Albert J. Wallash, Morgan Hill, all of Calif.

[73] Assignee: International Business Machines Corporation, Armonk, N.Y.

[21] Appl. No.: 363,460

[22] Filed: Dec. 23, 1994

[51] Int. Cl.⁶ .............................. G11B 5/127; G11B 5/10
[52] U.S. Cl. .................... 360/113; 360/104; 360/128
[58] Field of Search ................................. 360/113, 104, 360/126, 128

[56] References Cited

U.S. PATENT DOCUMENTS

| | | |
|---|---|---|
| 4,317,149 | 2/1982 | Elser et al. ........................ 360/126 |
| 4,785,366 | 11/1988 | Krounbi et al. .................... 360/113 |
| 4,800,454 | 1/1989 | Schwarz et al. ................... 360/103 |
| 5,206,590 | 4/1993 | Dieny et al. ...................... 324/252 |
| 5,247,413 | 9/1993 | Shibata et al. .................... 360/113 |
| 5,302,461 | 4/1994 | Anthony ......................... 360/113 X |

Primary Examiner—J. H. Wolff
Attorney, Agent, or Firm—Leslie G. Murray

[57] ABSTRACT

In a magnetic read/write transducer, the elements of the magnetoresistive (MR) and inductive heads are shorted together and to the slider substrate to provide a low resistance, conductive path bypassing the MR sensor element and minimizing electrical current through the MR sensor element during discharge of static electric charge. The MR sensor element, the MR conductive leads, the MR magnetic shield elements and inductive pole tips exposed at the slider air bearing surface are shorted together and to the slider substrate by a layer of conductive material, such as tungsten, formed over the slider air bearing surface. The conductive layer shorts the head elements together and to the slider substrate thus protecting the head against ESD/EOS damage during subsequent handling and assembly. The conductive layer is removed by wet etching prior to placing the magnetic head into operation in a magnetic storage system.

9 Claims, 2 Drawing Sheets

5,491,605

SHORTED MAGNETORESISTIVE HEAD ELEMENTS FOR ELECTRICAL OVERSTRESS AND ELECTROSTATIC DISCHARGE PROTECTION

BACKGROUND OF THE INVENTION

The present invention relates generally to magnetic disk drives and more particularly to protection of read/write transducers utilizing magnetoresistive read sensors against electrostatic discharge or electrical overstress during processing and assembly.

Magnetic head disk drive systems have been widely accepted in the computer industry as a cost effective form of data storage. In a magnetic disk drive system a magnetic recording medium, in the form of a disk, rotates at high speed while a magnetic read/write transducer, referred to as a magnetic head, "flies" slightly above the surface of the rotating disk. The magnetic disk is rotated by means of a spindle drive motor. The magnetic head is attached to or formed integrally with a "slider" which is suspended over the disk on a spring-loaded support arm known as the actuator arm. As the magnetic disk rotates at operating speed the moving air generated by the rotating disk in conjunction with the physical design of the slider operate to lift the magnetic head allowing it to glide or fly slightly above and over the disk surface on a cushion of air, referred to as an air bearing. The flying height of the magnetic head over the disk surface is typically only a few microinches or less and is primarily a function of disk rotation, the aerodynamic properties of the slider assembly and the force exerted by the spring-loaded actuator arm.

A major problem encountered during manufacture, handling and use of magnetic recording transducers, referred to as heads, is the buildup of electrostatic charges on the various elements of a head or other objects which come into contact with the heads, particular heads of the thin film type, and the accompanying spurious discharge of the static electricity thus generated. Static charges may be produced by the presence of certain materials, such as plastics, during manufacture and subsequent handling of the heads, for example. These charges arc across the edge of the insulating layer between the magnetic pole tips and adjacent conductive layers which are exposed and positioned adjacent to the transducing gap at the slider air bearing surface facing the recording medium. This discharge causes erosion of the pole tips and degradation of the transducer in reading and writing of data.

The above-described electrostatic discharge (ESD) problems associated with the thin film inductive read/write heads are well documented and several solutions have been proposed. Elser et al. U.S. Pat. No. 4,317,149 discloses an inductive head having short discharge paths formed by the deposition of conductive material in recesses formed in an insulating layer so that the static electric discharge will occur in areas displaced from the critical pole tip and gap area displaced from the critical pole tip and gap area at the slider air bearing surface. Schwartz et al. U.S. Pat. No. 4,800,454 discloses an inductive head assembly wherein the magnetic pole piece and the inductive coil winding are coupled to the slider to allow discharge of any static electric charges which may build up. The winding is connected to the slider body via a diode with high forward and reverse voltage drops, or through a fusible link.

Magnetoresistive (MR) sensors are well-known and are particularly useful as read elements in magnetic transducers, especially at high data recording densities. The MR read sensor provides a higher output signal than an inductive read head. This higher output signal results in a higher signal to noise ratio for the recording channel and thus allows higher areal density of recorded data on a magnetic disk surface to be achieved. As described above, when an MR sensor is exposed to ESD, or even a voltage or current input larger than that intended under normal operating conditions, referred to as electrical overstress or EOS, the MR read sensor and other pans of the head may be damaged. This sensitivity to electrical damage is particularly severe for MR read sensors because of these sensors' relatively small physical size. For example, an MR sensor used for extremely high recording densities will have a cross-section of 100 Angstroms (A) by 1.0 micrometers (um) or smaller. Discharge of voltages of only a few volts through such a physically small resistor is sufficient to produce currents capable of severely damaging or completely destroying the MR sensor. The nature of the damage which may be experienced by an MR sensor varies significantly, including complete destruction of the sensor via melting and evaporation, contamination of the air bearing surface, generation of shorts via electrical breakdown, and milder forms of damage in which the head performance may be degraded. This type of damage to the MR head has been found to occur during both processing and use and poses a serious problem in the manufacturing and handling of magnetic heads incorporating MR read sensors.

An electrical short provided across the input leads of the MR sensor element is very effective in raising the failure voltage and minimizing or eliminating damage to the MR head due to ESD. The shorted leads shunt the majority of the discharge current around the MR sensor element. Commonly assigned co-pending U.S. patent application Ser. No. 08/187,881 filed Jan. 26, 1994 discloses shorting the MR sensor element leads at the sensor input pads. However, application and removal of the short circuit, together with the process changes required to provide leads and associated connection pads for other head elements, such as the magnetic shields and substrate, can make this approach difficult and expensive to implement. Thus, a head design which provides electrical shorting of the head elements and which does not require extensive process changes, and allows easy removal of the short prior to the head being integrated and assembled in a magnetic storage disk drive is needed.

SUMMARY OF THE INVENTION

A principal object of the present invention is to minimize damage to an MR sensor caused by discharge of static electricity through or electrical overstress of the MR sensor element and other transducer components.

Another object of the present is to provide an MR sensor wherein the MR head elements are electrically shorted together and to the slider substrate to provide EOS and ESD protection by shunting excessive current away from the MR element and other critical head components.

In view of the foregoing objects, the present invention provides a thin film magnetic transducer comprising an MR read element wherein an electrically conductive coating is formed on the head air bearing surface (ABS). The conductive coating electrically shorts the MR head elements, i.e., the MR sensing element, the sensing element leads and magnetic shields, and the slider substrate together providing an electrically conductive path bypassing the MR sensor element for conducting spurious static electrical charge during an ESD transient to the substrate away from the MR sensor element. According to the present invention, the conductive coating is applied to the slider ABS after patterning and lapping of the ABS and is subsequently removed just prior to finally assembly of the disk drive.

In a preferred embodiment, industry-standard thin film deposition processes are used to provide the conductive coating. The coating material comprises any suitable material having low resistivity and which is dissolvable in a basic solution. For example tungsten (W) can be deposited using conventional vapor deposition techniques, has a high conductivity and is quickly dissolved in a basic solution. Additionally, a W coating provides corrosion protection for the MR sensor during subsequent handling and assembly.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which.

DETAILED DESCRIPTION OF THE PREFERRED EMBODIMENT

Figure 1:
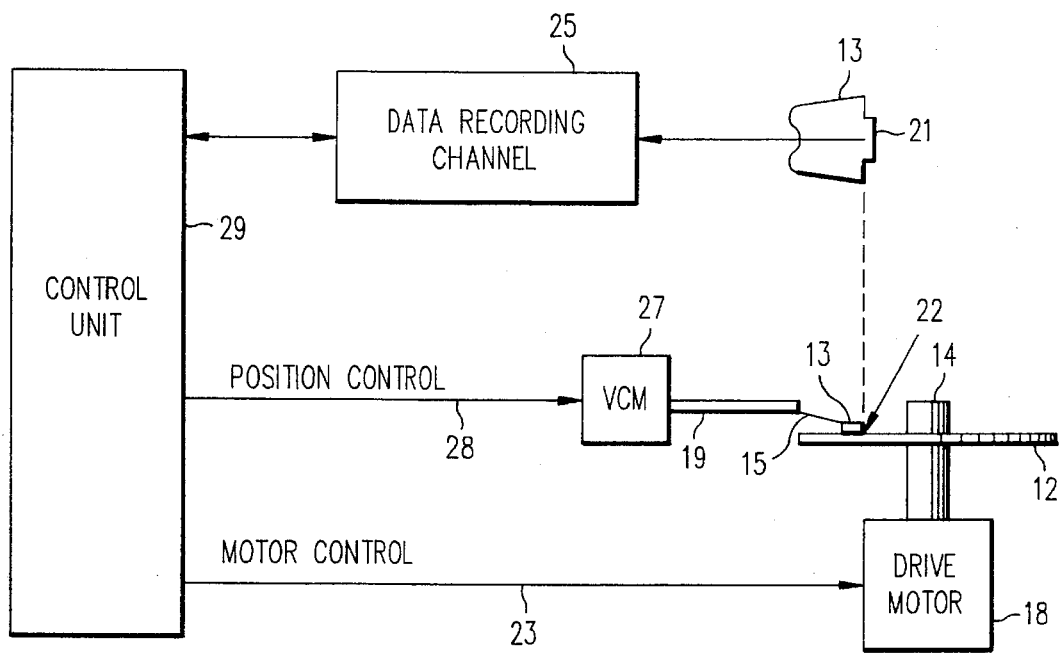
FIG. 1 is a simplified block diagram of a magnetic disk storage system embodying the present invention.

Referring now to FIG. 1, although the invention is described as embodied in a magnetic disk storage system as shown in FIG. 1, it will be apparent that the invention is also applicable to other magnetic recording systems such as a magnetic tape recording system, for example, or other applications in which a sensor is utilized to detect a magnetic field. A magnetic disk storage system comprises at least one rotatable magnetic disk 12 supported on a spindle 14 and rotated by a disk drive motor 18 with at least one slider 13 positioned on the disk 12. Each slider 13 supports one or more magnetic read/write transducers 21, typically referred to as read/write heads. The magnetic recording media on each disk is in the form of an annular pattern of concentric data tracks (not shown) on disk 12. As the disks rotate, the sliders 13 are moved radially in and out over the disk surface 22 so that the heads 21 may access different portions of the disk where desired data is recorded. Each slider 13 is attached to an actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 12 generates an air bearing between the slider 13 and the disk surface 22 which exerts an upward force or lift on the slider. The air bearing thus counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2A:
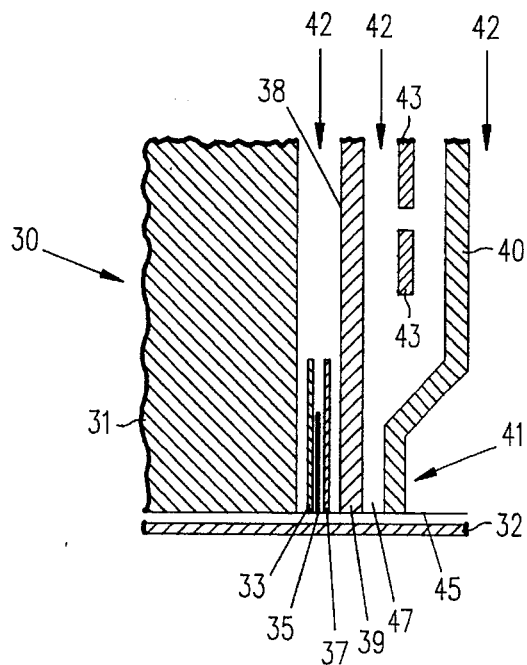
FIGS. 2a and 2b are cross-sectional views of MR read/ inductive write magnetic heads.
Figure 2B:
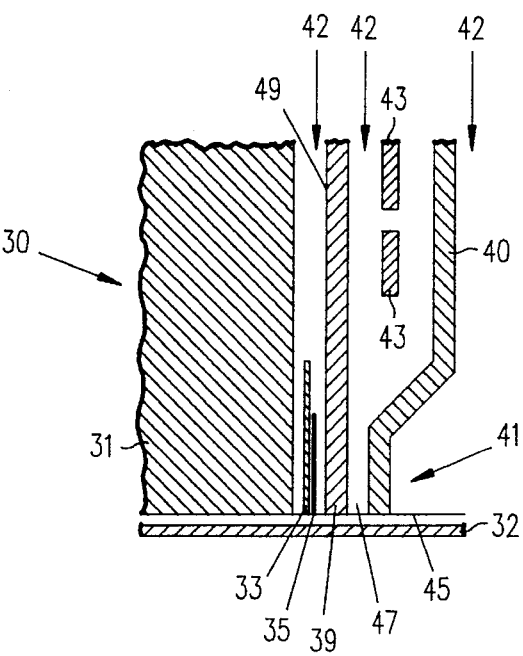
Figure 3:
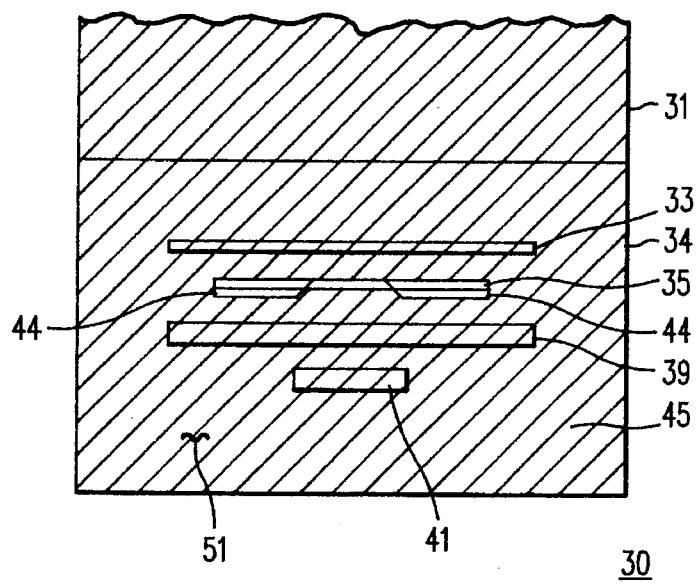
FIG. 3 is a plan view of the air bearing surface of the MR head shown in FIG. 2b illustrating the conductive coating according to the present invention.

Referring now to FIGS. 2a and 2b, a portion of a MR read/inductive write magnetic head 30 is shown in transducing relationship with a rotating magnetic recording disk 32 such that the head air bearing surface 45 (ABS) is disposed in facing relationship with and slightly above the disk recording surface. Generally, such a head 30 includes an MR read assembly and an inductive write assembly formed adjacent one another on a substrate surface. The substrate surface is typically the vertical surface forming the trailing end of the slider 13 (as shown in FIG. 1) carrying the magnetic head. The MR read assembly comprises a MR sensing element 35 fabricated of a ferromagnetic material, such as a nickel-iron (NiFe) alloy, for example, which is enclosed by first and second magnetic shield elements 33 and 37, respectively. The MR sensing element can comprise a single layer of NiFe, commonly referred to as Permalloy. More typically, the MR sensing element will comprise a multilayer magnetic structure, including magnetic bias layers, of the type described in U.S. Pat. No. 4,785,366 or of the type described in U.S. Pat. No. 5,206,590, utilizing the giant MR effect. The shield elements 33 and 37 are generally made of a highly permeable magnetic material, such as Permalloy or Sendust, a trialloy of aluminum-silicon-iron. The magnetic shield elements 33 and 37 minimize or eliminate magnetic interferences from affecting the MR element 35 and thereby producing extraneous electrical pulses. Conductive leads 44 (as shown in FIG. 3), generally copper (Cu) or other suitable conductive material, attached electrically at the end portions of the MR element 35 couple the MR element to external circuitry to provide a means for sensing the resistance of the MR element.

The MR read assembly is formed by vacuum deposition techniques, such as sputter deposition, for example, on the substrate 31. The various elements of the MR assembly are surrounded and insulated from each other by layers 42 of insulating material, such as silicon dioxide ($SiO_2$,) or aluminum oxide ($Al_2O_3$), for example.

The inductive write assembly comprises a lower or first pole piece 38 and an upper or second pole piece 40. The first and second pole pieces 38, 40 are made of a highly permeable magnetic material such as NiFe, for example, and form a magnetic circuit magnetically connected together at a back gap portion (not shown) with the first and second pole tips 39 and 41 forming a magnetic gap 47 at the air bearing surface 45. One or more layers of electrical conductors 43, generally made of Cu, for example, form the inductive coil disposed between the first and second pole pieces 38, 40. The inductive coil 43 is also connected to external circuitry via conductive leads. The pole pieces 38, 40 and the inductive coil conductors 42 are fabricated by well-known processes such as electro-plating or sputter deposition, for example. The pole pieces are insulated electrically from the inductive coil and the MR read assembly by layers 42 of insulating material. Additionally, the entire assembly is covered with a capping layer 42 of insulating and protective material.

The head 30 shown in FIG. 2a is sometimes referred to as a "piggyback" head. An alternate configuration referred to as a "merged" head wherein the second MR magnetic shield element 37 is merged with the inductive assembly first pole piece 38 to form a single element 49 which performs both functions is shown in FIG. 2b.

As described above in the background section, static electrical charges built up on the various components of the head assembly 30 or on any object, equipment or person which may come into contact with or closely approach the head assembly or any electrical leads attached to the head assembly pose the potential for serious damage to the head. These charges are built up during the manufacturing process and during subsequent handling of the heads. For example, the assembly of the head with other components to produce a disk drive assembly can result in relatively large amounts of static electrical charge accumulating on the head elements. The electrical charges migrate from the areas at which they are generated to build up along conductive paths. Thus a buildup of static charge occurs that subsequently results in a discharge from one conductive element across a dielectric, which experiences "breakdown", to another conductive element, in the manner of a capacitive discharge. The discharge typically causes damage by burnout or the like at the areas of the conductive material which act as terminals for the discharge of the stored static electrical energy. As discussed above with reference to U.S. Pat. Nos. 4,317,149 and 4,800,454, the problems concerning electrostatic discharge (ESD) for inductive heads are well-known and the referenced patents provide methods and structure for protection of inductive heads.

While the coil conductors 43 and the magnetic pole pieces 38, 40 can withstand relatively high voltages and currents, because of its physically small cross-section, the MR sensing element is particularly sensitive to current and voltage overloads. The active sensing portion of the MR element will have a length in the range of 0.5 to 20 um, a height (width) of 0.5 to 5 um and a thickness of 10 to 100 nanometers (nm) and a resistance of about 20 to 80 ohms. In MR read assemblies of the types shown in FIGS. 2a and 2b, it has been found that such damage occurs along the sensing region of the MR element 35 when the accumulated static charge is discharged directly through the MR element 35 and may or may not include discharge to the magnetic shield elements or first pole piece or the body of the slider (substrate).

Figure 4:
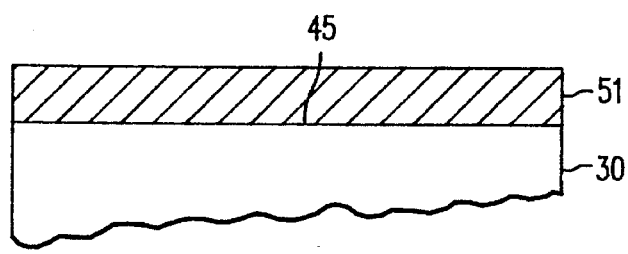
FIG. 4 is an edge view of the MR head shown in FIG. 3 illustrating the conductive coating.

Referring now to FIGS. 3 and 4, in accordance with the present invention electrostatic discharge and electrical overstress protection for an MR head is accomplished by providing a conductive coating or layer 51 on the head air bearing surface 45 which electrically shorts the MR head elements exposed at the air bearing surface 45 to the slider substrate 31. FIG. 3 is a plan view from the air bearing surface of the head assembly 30 illustrating a merged MR head as described above with reference to FIG. 2b. All of the head elements, with the exception of the inductive coil 43, are exposed at the head air bearing surface 45. A layer 51 of conductive material formed over and coating the air bearing surface 45 electrically shorts all of the exposed head elements together. That is, the conductive layer 51 electrically shorts the first magnetic shield 33, the MR sensor element 35, the MR leads 44, the second shield/first inductive pole tip 39 and the second inductive pole tip 41 to each other and further to the substrate 31. Thus any electrical charge built up on the head elements will be discharged directly to the substrate 31 shunning any current around the MR sensing element 35. The conductive layer 51 may coat only that portion of the head air bearing surface sufficient to short the exposed head elements to the substrate or may, alternatively, coat the entire slider/head air bearing surface. The conductive layer 51 also prevents or minimizes sparkover damage and dielectric breakdown between the MR leads 44, the first magnetic shield 33 and second magnetic shield/first pole tip 39, and the conductive slider substrate 31.

In a preferred embodiment, an 800 Angstrom (A) thick tungsten (W) layer was deposited onto to the slider air bearing surface 45 covering the exposed head elements. The resistance of the MR heads changed from 28 ohms without the W layer to 3 ohms (contributed to the lead resistance) after deposition of the W layer. Test data (human body model) shows that the failure voltage for the MR sensor element 35 increased from 100 volts for no W layer to 3,000 volts with the W layer (while the sparkover voltage increased from 600 volts with no W layer to 6,000 volts with the W layer).

The conductive layer 51 may be formed by any suitable technique, such as vacuum deposition techniques. In a preferred embodiment, conductive layer 51 of W is deposited over the air bearing surface 45 by sputter deposition through a stencil mask. The conductive layer 51 is formed as early as practical in the head manufacturing process to provide ESD/EOS protection for as much of the fabrication and assembly process as possible. For example, the conductive layer 51 may be deposited at the completion of the air bearing surface lapping process prior to separating the individual heads/sliders from the wafer or row. The conductive layer 51 is then removed at a subsequent processing step, preferably as late as practical in the manufacturing and assembly process prior to the final customer level operating configuration of the disk drive assembly. For example, the conductive layer 51 may be removed once the head and its associated suspension means has been assembled into a head stack assembly (HSA) by dipping the head end of the HSA in a suitable oxiding etchant. The conductive layer 51 can be of any material having sufficient electrically conductivity and which can be removed from the slider air bearing surface without appreciable damage to the other components of the slider/head and suspension assembly.

The conductive layer 51 may be removed by any suitable process, such as etching or laser oblation. Preferably, the conductive material for layer 51 will be of a material dissolvable in a basic solution. For example, W is soluble in a basic solution having a pH of 8–9 whereas the materials utilized for the other head elements and body are not etched appreciably in a solution having a pH of less than 10.0. For example, at a pH greater than 10.0 alumina ($Al_2O_3$), a common dielectric material utilized in heads as insulation, exhibits significant etching in basic solutions having a pH greater than 10.0. Suitable etch solutions for W comprise basic solutions of ferric cyanide or a solution of dipotassium hydrogen phosphate, sodium persulfate and a surfactant, i.e., a wetting agent, such as Triton X 100 (octylphenoxypolyethoxy ethanol), a pH adjusted to 8.5 plus or minus 0.15. The material used for conductive layer 51 must be a good electrical conductor and must make reliable contact to the device elements. It must also be durable, adherent to the air bearing surface material and immune to attack by subsequent manufacturing and assembly processes. Further it must be removable without any adverse affect on the magnetic head.

Figure 5:
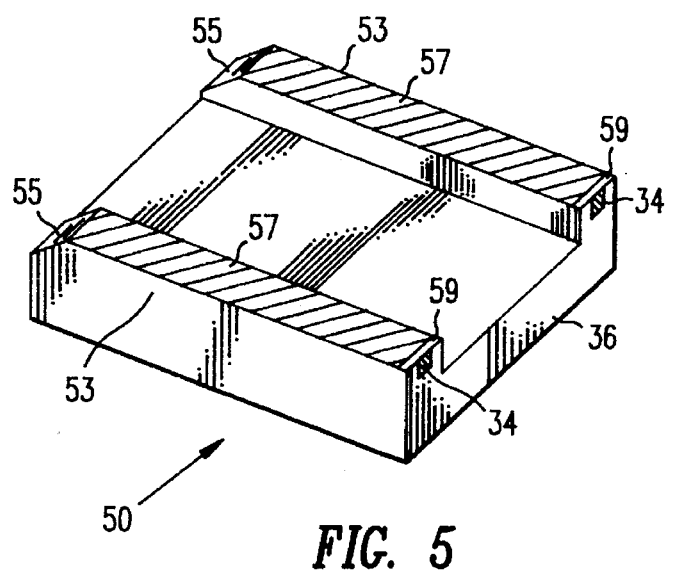
FIG. 5 is a perspective view of a slider having a wear layer on its air bearing surface and illustrating the conductive coating according to the present invention.

Referring now also to FIG. 5, a perspective view of a typical slider 50 having magnetic heads 34 formed on the slider trailing edge 36 is shown. The slider has a rectangular rail 53 along each of the slider edges aligned parallel to the longitudinal axis of the slider. The top surface of each rail 53 forms the slider air bearing surface. The leading edge of each rail 53 has an upward slope, or ramp 55 formed across the entire width of the rail. The magnetic head assembly 34 is mounted on or formed integrally with the slider trailing edge 36 having the head elements exposed at the air bearing surface 59 as shown in FIGS. 2a, 2b and 3. In some applications, it is common to apply a wear layer 57 of carbon or other suitable material to the slider air bearing surface. The wear layer 57 typically is formed at the conclusion of the lapping and etching processes forming the slider air bearing surface. In a preferred embodiment according to the present invention, the wear layer 57 only partially covers the air bearing surface while that portion 59 of the air bearing surface where the head 34 elements are exposed is coated with conductive layer 51. The conductive layer 51 provides ESD/EOS protection, as described above, during subsequent processing and assembly of the slider and head disk assembly. Prior to final integration of the slider (at the HSA level) into the head disk assembly, the conductive layer 51 only is removed as described above thus leaving the wear layer 57 over the remainder of the air bearing surface.

While the present invention has been particularly shown and described with reference to preferred embodiments thereof, it will be understood by those skilled in the art that various changes in form and detail may be made therein without departing from the spirit, scope and teaching of the invention. Accordingly, the invention herein disclosed is to be considered merely as illustrative and limited in scope only as specified in the appended claims.

We claim:

1. A method for protecting a magnetoresistive sensor element in a magnetic head assembly from damage caused by electrostatic discharge, said magnetic head assembly supported on a substrate and including at least a magnetoresistive sensor element disposed in spaced relationship between a pair of magnetic shield elements, a pair of electrical lead conductors, each of said electrical lead conductors attached to said magnetoresistive sensor element at opposite ends thereof, said magnetoresistive sensor element, said magnetic shield elements and said lead conductors being exposed at an air bearing surface of said magnetic head assembly, said method comprising the step of coating at least a portion of said air bearing surface with a layer of conductive material shorting said magnetoresistive sensor element, said magnetic shield elements and said conductive leads together and to said substrate.

2. A method as in claim 1 including the additional step of removing said conductive layer prior to said magnetic head assembly being assembled in a head disk assembly.

3. A method as in claim 1 wherein said conductive material comprises a material dissolvable in a basic solution.

4. A method as in claim 3 wherein said basic solution has a pH less than 10.0.

5. A method as in claim 4 wherein said basic solution comprises a solution of ferric cyanide.

6. A method as in claim 4 wherein said basic solution comprises a solution of sodium persulfate, dipotassium hydrogen phosphate and a surfactant.

7. A method as in claim 6 wherein said surfactant comprises octylphenoxypolyethoxy ethanol.

8. A method as in claim 3 wherein said conductive material comprises tungsten.

9. A method as in claim 1 wherein said conductive material comprises tungsten.

* * * * *